United States Patent
Aceves et al.

(10) Patent No.: US 6,708,502 B1
(45) Date of Patent: Mar. 23, 2004

(54) LIGHTWEIGHT CRYOGENIC-COMPATIBLE PRESSURE VESSELS FOR VEHICULAR FUEL STORAGE

(75) Inventors: Salvador Aceves, Livermore, CA (US); Gene Berry, Mt. View, CA (US); Andrew H. Weisberg, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/260,079

(22) Filed: Sep. 27, 2002

(51) Int. Cl.[7] ............................. F17C 1/00; F17C 13/00; F17C 3/00
(52) U.S. Cl. ................. 62/45.1; 220/560.08; 220/560.1
(58) Field of Search ...................... 62/45.1; 220/560.08, 220/560.1

(56) References Cited

U.S. PATENT DOCUMENTS 3,904,067 A * 9/1975 Kuniyasu et al. ............ 62/45.1
3,930,375 A * 1/1976 Hofmann ..................... 62/45.1
3,942,331 A * 3/1976 Newman, Jr. et al. ........ 62/45.1
3,952,531 A * 4/1976 Turner ......................... 62/45.1
4,287,720 A * 9/1981 Barthel ........................ 62/45.1
5,419,139 A * 5/1995 Blum et al. ................... 62/45.1
5,613,366 A * 3/1997 Schoenman ................. 62/45.1
6,155,058 A * 12/2000 Kanno et al. ................. 62/45.1

* cited by examiner

Primary Examiner—William C. Doerrler
(74) Attorney, Agent, or Firm—James M. Tak; Alan H. Thompson

(57) ABSTRACT

A lightweight, cryogenic-compatible pressure vessel for flexibly storing cryogenic liquid fuels or compressed gas fuels at cryogenic or ambient temperatures. The pressure vessel has an inner pressure container enclosing a fuel storage volume, an outer container surrounding the inner pressure container to form an evacuated space therebetween, and a thermal insulator surrounding the inner pressure container in the evacuated space to inhibit heat transfer. Additionally, vacuum loss from fuel permeation is substantially inhibited in the evacuated space by, for example, lining the container liner with a layer of fuel-impermeable material, capturing the permeated fuel in the evacuated space, or purging the permeated fuel from the evacuated space.

23 Claims, 3 Drawing Sheets

LIGHTWEIGHT CRYOGENIC-COMPATIBLE PRESSURE VESSELS FOR VEHICULAR FUEL STORAGE

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to pressure vessels for fluid storage applications. More particularly, the present invention relates to a lightweight, insulated pressure vessel for the cryogenic-compatible flexible storage of alternative fuels, such as cryogenic liquid hydrogen or compressed hydrogen gas at ambient or cryogenic temperatures, in high-efficiency alternative fuel vehicles.

BACKGROUND OF THE INVENTION

Efficient fuel storage and the related matters of storage tank weight and bulk are perhaps the most significant problems associated with light-duty alternative fuel vehicles, such as hydrogen or natural gas-fueled cars.

One method of reducing the weight of a pressure vessel for lightweight vehicle application is shown in U.S. Pat. No. 5,798,156 utilizing a lightweight polymer to line a compressed gas storage vessel constructed from, for example, a graphite epoxy composite. The liner includes a thin layer of low permeability metal deposited onto the polymeric layer to reduce the permeation rate to acceptable low values. The '156 patent, however, is limited to gas pressure vessels and does not consider, describe, or suggest cooling temperatures below that required for liquefaction of such fuels.

Additionally, low-pressure cryogenic storage tanks have also been utilized for their compactness and low weight. Conventional low-pressure cryogenic tanks typically consist of a vessel for containing a cryogenic liquid, (such as liquid hydrogen, $LH_2$ or liquid natural gas LNG) and a jacket spaced from and surrounding the vessel. The space between the vessel and the jacket is evacuated, and a thermal insulating media placed therein such that the thermal insulating media inhibits heat transfer to the cryogenic liquid which can cause vaporization and expansion. Unfortunately, evaporative losses occur during fueling of low-pressure $LH_2$ tanks, and during periods of inactivity due to heat transfer from the environment. And furthermore, for low-pressure $LH_2$ storage in particular, substantial amounts of electricity are required to liquefy the hydrogen (about 40% of the lower heating value of the hydrogen). Differences between these conventional low-pressure cryogenic storage tanks and high-pressure cryogenically-insulated pressure vessels of the present invention, are discussed in the publications by Applicant entitled, "Thermodynamics of Insulated Pressure Vessels for Vehicular Hydrogen Storage," UCRL-JC-128388, June 1997, and "Analytical and Experimental Evaluation of Insulated Pressure Vessels for Cryogenic Hydrogen Storage," International Journal of Hydrogen Energy 25 (2000), both of which are incorporated by reference herein.

SUMMARY OF THE INVENTION

One aspect of the present invention includes a lightweight, cryogenic-compatible pressure vessel for flexibly storing fluids, such as cryogenic liquids or compressed gases at cryogenic or ambient temperatures, the pressure vessel comprising: an inner pressure container enclosing a storage volume; an outer container surrounding the inner pressure container and forming an evacuated space therebetween; a thermal insulator surrounding the inner pressure container in the evacuated space to inhibit heat transfer to the storage volume; and means for substantially inhibiting vacuum loss in the evacuated space due to fluid permeation through the inner pressure container, whereby cryogenic insulation may be maintained when storing cryogenic liquids or compressed gases at cryogenic temperatures.

And another aspect of the present invention includes a lightweight, cryogenic-compatible pressure vessel for flexibly storing cryogenic liquid fuels or compressed gas fuels at cryogenic or ambient temperatures in vehicles, the pressure vessel comprising: an inner pressure container enclosing a fuel storage volume; an outer container surrounding the inner pressure container and forming an evacuated space therebetween; a thermal insulator surrounding the inner pressure container in the evacuated space to inhibit heat transfer to the fuel storage volume; and means for substantially inhibiting vacuum loss in the evacuated space due to fuel permeation through the inner pressure container, whereby cryogenic insulation may be maintained when storing cryogenic liquid fuels or compressed gas fuels at cryogenic temperatures.

BRIEF DESCRIPTION OF THE DRAWINGS

The accompanying drawings, which are incorporated into and form a part of the disclosure, are as follows.

DETAILED DESCRIPTION

The present invention is directed to a lightweight, cryogenic-compatible pressure vessel capable of flexibly storing fluids, such as cryogenic liquids as well as compressed gases, at cryogenic or ambient temperatures. For fuel storage applications, such as for alternative fuel vehicles (AFV), the pressure vessel is designed to store cryogenic liquid fuels, (e.g. liquid hydrogen, "$LH_2$", or liquid natural gas, "LNG"), and compressed gas fuels at cryogenic or ambient temperatures (e.g. compressed hydrogen, "$CH_2$", or compressed natural gas, "CNG"). The choice of fueling options, serves to optimize storage to suit various purposes, such as maximizing driving range versus minimizing fueling cost. For example, the lightweight cryogenic-compatible pressure vessel of the present invention may be filled with either cryogenic liquid hydrogen which provides a greater range but costs more to fill, or compressed hydrogen gas, at cryogenic or ambient temperatures which provides a shorter range but significantly reduces costs. The insulated pressure vessel of the present invention strikes a balance between the low cost but higher bulk of ambient-temperature $CH_2$ storage, and the compactness, energy intensity, and evaporative losses of $LH_2$ storage.

While hydrogen and natural gas are two of the more common examples of alternative fuels used for AFV applications, other fuels may also be utilized which are suitable for compressed gas storage and cryogenic liquid storage. In the present discussion, hydrogen is used as an exemplary fuel for generally illustrating operation of the present invention. Additionally, while the advantages of a lightweight cryogenic-compatible pressure vessel are readily apparent for vehicular storage applications, it is not limited only to such. The present invention may be generally used for any application requiring flexibility in the types of fluids stored.

Figure 1:
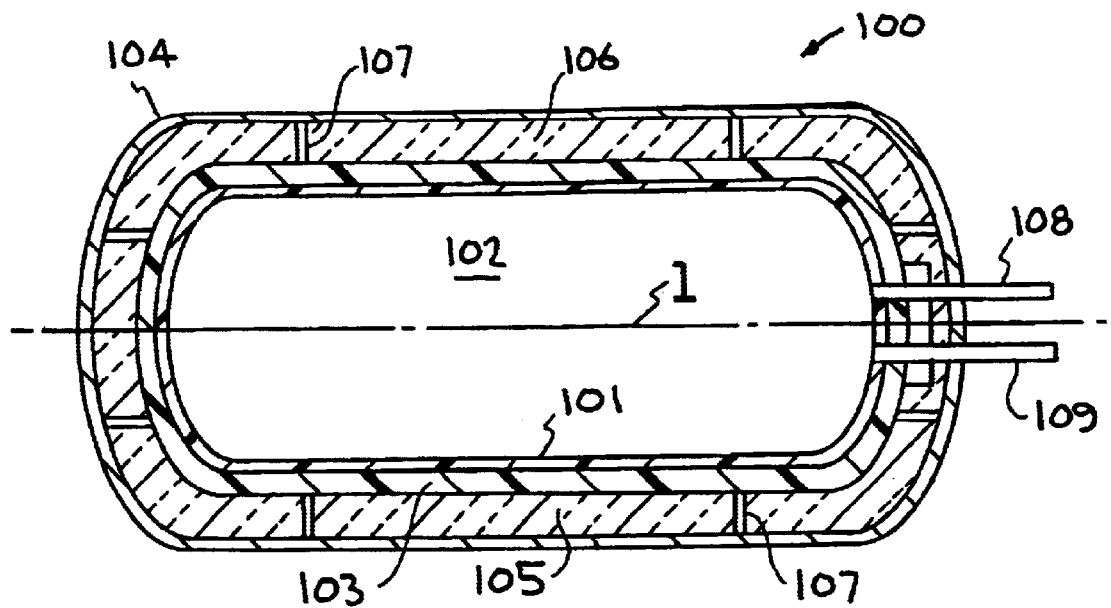
FIG. 1 is a longitudinal cross-sectional view illustrating a first embodiment of the present invention.

Turning to the drawings, FIG. 1 shows a longitudinal cross-sectional view of a first embodiment of the lightweight, cryogenic-compatible pressure vessel 100 having a central axis 1. The pressure vessel 100 generally has an elongated cylindrical configuration along the central axis 1 with rounded elliptical hemispherical ends, as is typical of pressure vessel design in the art. Furthermore, the pressure vessel 100 includes an inner pressure container 103 surrounding and enclosing a storage volume 102, and an outer container 104 surrounding the inner pressure container 103 to form an evacuated space 105 therebetween. Insulated cross supports 107 separate and suspend the inner pressure container 103 from the outer container 104, to prevent heat conduction therebetween. And access into and out of the storage volume 102 is by an inlet port 108 and an outlet port 109 extending through the inner pressure container 103 and the outer container 104. The outer container 104 has a lightweight rigid body construction capable of supporting the evacuated space 105 therein, with aluminum or stainless steel being exemplary material types used for its construction.

Given that weight is of critical importance in pressure vessels, especially for vehicular applications, the inner pressure container 103 is a lightweight rigid structure having a high strength-to-weight ratio. Moreover, the construction of the inner pressure container 103 is configured to withstand high pressures (due to compressed gas storage) from within the fuel storage volume 102. For example, light-duty vehicular storage applications using compressed gas fuels may typically have operating pressures up to 5000 psi when storing 5 kg of $H_2$ in a 250 liter external volume. In any case, the inner pressure container 103 is typically made from a lightweight composite material having a fiber reinforced resin matrix construction, using manufacturing methods known in the art. Composite constructions, such as carbon-fiber, fiber-epoxy, the composite material sold under the trademark "Kevlar," etc., provide numerous advantages such as lightness in weight and resistance to corrosion, fatigue and catastrophic failure. This combination of lightness in weight and resistance to failure is possible due to the high specific strength of the reinforcing fibers or filaments (carbon, glass, aramid, etc.) which, in the construction of pressure vessels, is typically oriented in the direction of the principal stresses.

As shown in FIG. 1, the inner pressure container 103 may additionally include an inner liner 101 which lines the inside surface thereof. The inner container liner 101 is preferably composed of a lightweight non-metallic material, such as a polymeric material, in order to achieve substantial weight reduction of the pressure vessel (compared to aluminum liners commonly used for conventional pressure vessels). Exemplary polymeric materials include polyethylene, nylon, kapton, or other polymers, but are not limited only to such. The substantial weight reduction provided by using a polymeric liner instead of an aluminum liner can be appreciated by the potential weight savings of 10–15 kg for a 35–40 kg total vessel mass in the 5 kg $H_2$/ 250 liter pressure vessel example discussed above (where the aluminum liner has an approximate average thickness of 3 mm). Where an inner liner is used, construction of the composite-construction inner pressure container typically involves wrapping fibers over the liner in order to produce the fiber reinforced resin matrix. However, in the case of a composite inner vessel sans inner liner, fabrication of the inner container 103 typically involves a water-soluble or otherwise removable mandrel. In any case, the plastic liner 101 and the composite inner pressure container 103 are selected and designed for suitable operation over a wide range of temperatures, from liquid hydrogen temperatures (20 K) up to high temperatures that may result while the vessel is filled with compressed hydrogen (up to 400 K).

As shown in FIG. 1, the pressure vessel 100 also includes a thermal insulator 106 surrounding the inner pressure container 103 in the evacuated space 105. The thermal insulator 106 serves to inhibit heat transfer to the storage volume 102. One exemplary embodiment of the thermal insulator comprises an external vacuum multi-layer insulation to reduce heat transfer to the storage volume, especially during cryogenic operation. The outer container 104 operates to keeps a vacuum around the vessel, which is required for effective operation of the multi-layer insulation. In an exemplary embodiment, the pressure vessel is insulated with multilayer vacuum superinsultation (MLVSI). MLVSI exhibits good thermal performance only under a high vacuum, at a pressure lower than 0.01 Pa ($7.5 \times 10(-5)$ mm Hg).

While the use of a polymeric liner (or the removal of the liner altogether) provides substantial weight reduction to the pressure vessel, it also comes at a substantial cost. Non-metallic liners such as polymeric liners are subject to fluid, e.g. hydrogen gas, permeation therethrough. Having hydrogen in the vacuum insulation space, for example, will quickly increase the conductivity of the insulation to a value high enough that significant heat transfer will occur, resulting in rapid evaporation of cryogenic hydrogen stored in the vessel. While no vacuum is needed when hydrogen is stored at ambient temperature, maintaining a vacuum inside the insulated evacuated space is necessary when the tank is filled with cryogenic hydrogen to enable optimal operation of the multi-layer insulation 106 discussed above. The vacuum necessary for efficient operation of the multi-layer insulation is approximately $7.5 \times 10^{-5}$ Torr. Therefore, various means for substantially inhibiting vacuum loss in the evacuated space is provided to address the influx of permeating hydrogen. The term "substantially inhibiting" as used herein and in the claims, includes preventing or at least controlling permeation and vacuum loss so that the evacuated space has a sufficient vacuum for the multi-layer insulation 106.

FIGS. 2–6 illustrate five exemplary methodologies for substantially inhibiting vacuum loss in cryogenic pressure vessels having a plastic liner or with no liner. These methodologies can be applied individually or in combination with one another.

Figure 2:
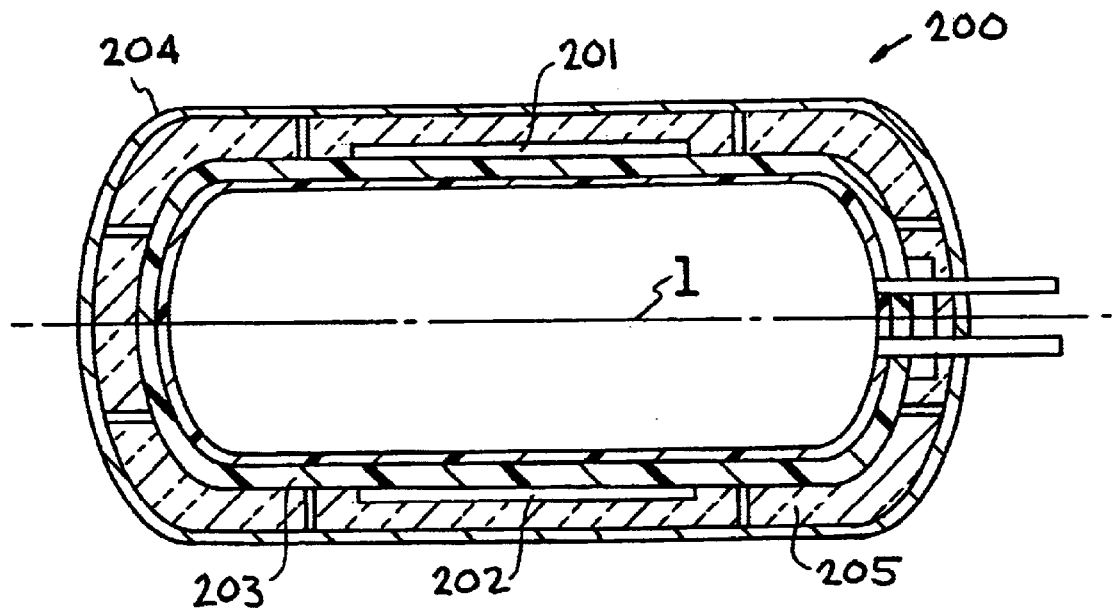
FIG. 2 is a longitudinal cross-sectional view illustrating a second embodiment of the present invention.

As can be seen in FIG. 2, a second embodiment of the pressure vessel is shown at reference character 200. A getter material 201, 202 is preferably used as the means for substantially inhibiting vacuum loss in the evacuated space for addressing very low total permeation rates into the evacuated space. Small volumes of getter material are used as a "molecular sieve" to adsorb or absorb masses of permeated hydrogen much smaller than their own mass. A few pellets or a small chunk of getter material thereby sequesters a small fraction of the contained hydrogen before its permeation could curtail vacuum insulation. It is known that getters can be regenerated to consume more permeated hydrogen by thermal cycling and/or vacuum pumping, replaced entirely, or may have adequate capacity by design to handle the entire life of the tank. As can be seen in FIG. 2, the getter material 201, 202 is located on the inner pressure container 203 in the evacuated space 205. It is appreciated, however, that other locations within the evacuated space 205 are also possible.

Figure 3:
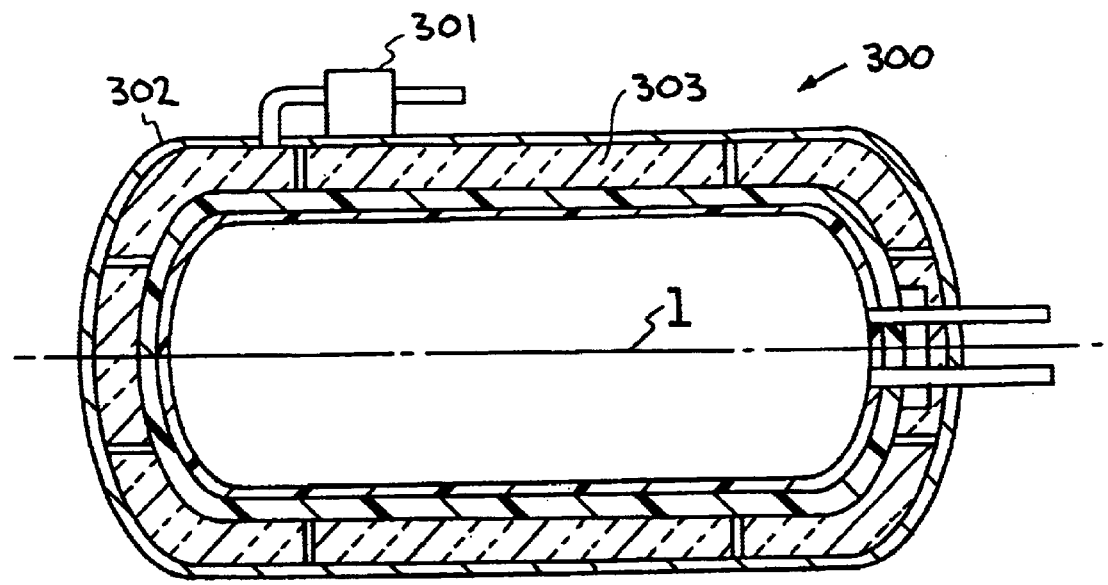
FIG. 3 is a longitudinal cross-sectional view illustrating a third embodiment of the present invention.

As shown in FIG. 3, a third embodiment of the pressure vessel is shown at reference character 300. A mechanical pump 301 is shown for purging permeated hydrogen found in the evacuated space 303. The pump 301 may be located on the outer container 302 or other suitable location for communicating between the evacuated space 303 and beyond the pressure vessel. At almost any level of permeation, mechanical vacuum pumps could balance permeated hydrogen flux to maintain an effective vacuum insulation space below $7.5 \times 10^{-5}$ Torr (FIG. 3). At low levels of permeation, cryogenic and ion pumping may also be used to maintain effective vacuum insulation. Miniaturization and intermittent operation are advantageous for microgram/hour permeation, while intermittent external (off-board the vehicle) pumping could assist well-insulated hydrogen storage systems without requiring additional onboard pumps (but would require an interconnection for moderate vacuum pumping).

Still another means (not shown) for substantially inhibiting vacuum loss in the evacuated space is the use of catalysts deployed on high surface area substrates (e.g. foils and molecular sieves) to capture permeated hydrogen by reacting it with oxygen and converting it to water. This water is then frozen on the outer surface of the inner tank. The vapor pressure of the water is low enough at the low temperature that the vacuum insulation could work properly even in the presence of the ice.

Figure 4:
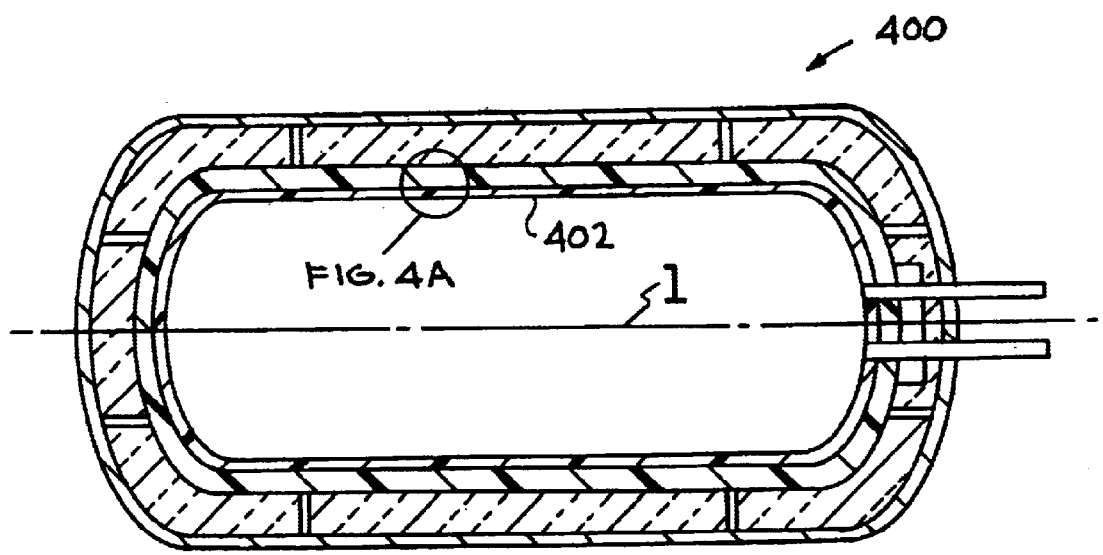
FIG. 4 is a longitudinal cross-sectional view illustrating a fourth embodiment of the present invention.
Figure 4A:
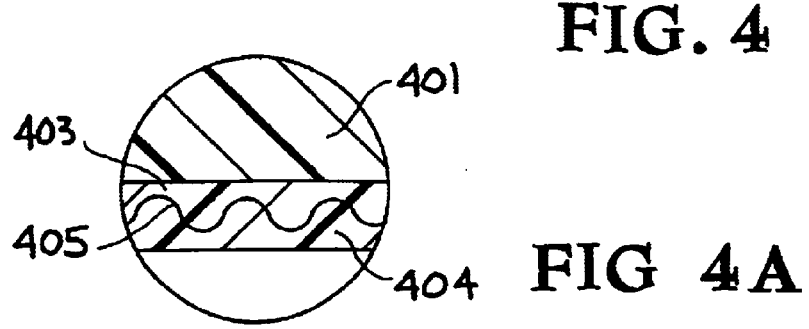

FIGS. 4 and 4A together show a fourth embodiment of the pressure vessel indicated at reference character 400. While thin metal and intermetallic coatings deposited directly on surfaces are known for substantially inhibiting hydrogen permeation, these layers are likely to detach from the surface of the tank due to the high tensile strain levels typical of lightweight pressure vessels (built with the most mass-efficient composite structural materials, typically operated at up to 1.5–2.5% strain). A solution to this problem is shown in FIG. 4 and FIG. 4A by texturing the metallic layers and embedding them in more compliant layers that loads most of their area in folds to preserve their high impermeability. The textured metallic layers are shown as crenelations having regular gaps or embrasures which enable flexing of the metallic layer to compensate for expansions/contractions of the pressure container. This methodology is illustrated in FIGS. 4 and 4A. As shown, the inner liner 402 includes a thin (perhaps <10 micron thick) metal 404 which is sandwiched between an outer layer of liner 403 and an inner layer of liner 404. This arrangement of the pressure vessel 400 is designed for extremely low permeability to hydrogen. Preliminary calculations by the Applicant have shown that a very thin (e.g. 10 micron) metallic layer applied on the plastic liner 402 can provide the required resistance to permeability for the useful life of the pressure vessel. This thin metallic layer would have a very small effect in increasing the weight of the vessel.

Dendritic surfaces (not shown) may additionally be used for the means for substantially inhibiting vacuum loss, to provide surface area enhancement by several orders of magnitude. As applied on pressure vessel surfaces, their interiors, both faces of liners, insulating layer (foil) surfaces, and the interior of the evacuated space confinement shell, these dentritic surfaces operate to assist sequestration rates of getters, catalysts, and ice capture techniques.

Figure 5:
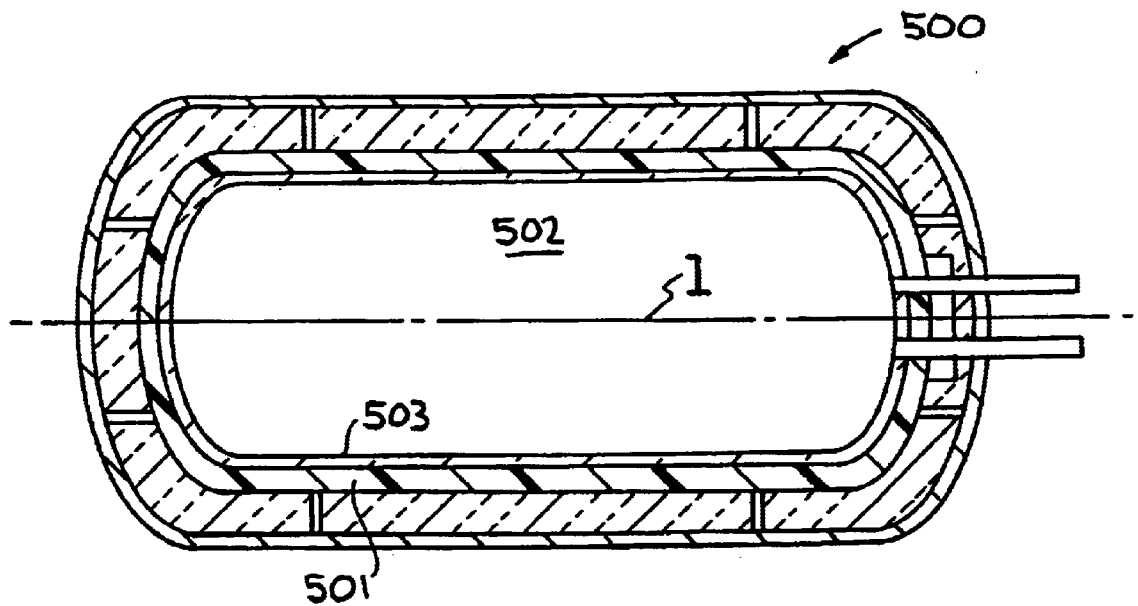
FIG. 5 is a longitudinal cross-sectional view illustrating a fifth embodiment of the present invention.

FIG. 5 shows a fifth embodiment of the pressure vessel indicated at reference character 500. In this exemplary embodiment, the means for substantially inhibiting vacuum loss in the evacuated space comprises a thin glass layer 503 lining the inner liner 501. The glass layer 503 may include amorphous metals, ceramics, and intermetallics. These have the potential to directly survive many pressure cycles as thin layers taken to high tensile strain. Therefore, they could be applied to the inner surface of the liner 501 bordering the storage volume 502, where they could survive the pressure and temperature cycles. They are also known to be impermeable to hydrogen, to effectively reduce the hydrogen pressure in the evacuated space.

Figure 6:
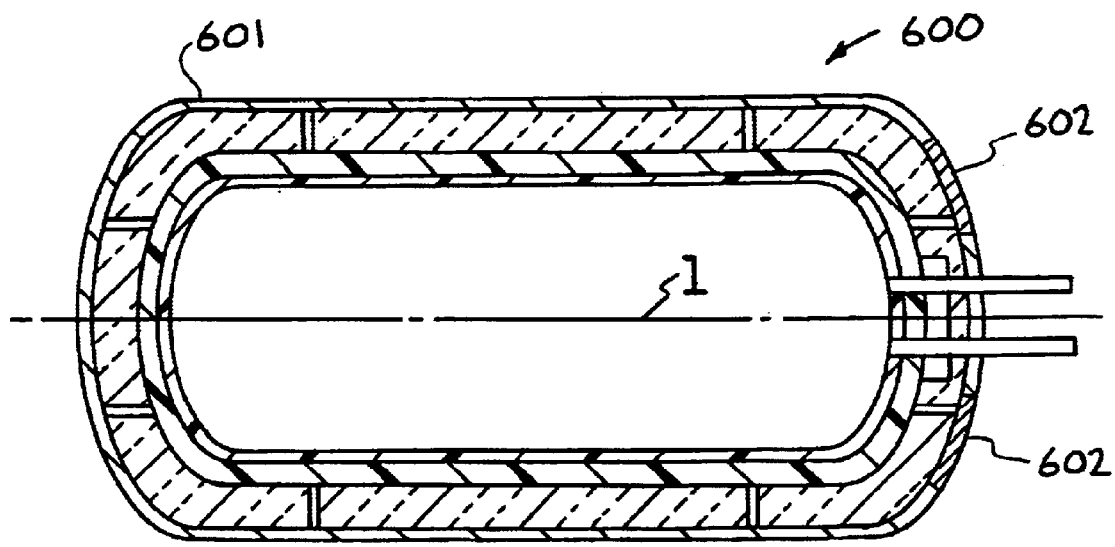
FIG. 6 is a longitudinal cross-sectional view illustrating a sixth embodiment of the present invention.

FIG. 6 shows a sixth embodiment of the pressure vessel of the present invention, indicated at reference character 600. In this exemplary embodiment, the means for substantially inhibiting vacuum loss is a specific-fluid-only permeable membrane which allows only the specific-fluid to pass. For example, in the case of hydrogen, the specific-fluid-only membrane is a palladium membrane 602 which allows only hydrogen to escape the vacuum insulation space through the outer container 601, without allowing the constituents of air to enter.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A lightweight, cryogenic-compatible pressure vessel for flexibly storing fluids, such as cryogenic liquids or compressed gases at cryogenic or ambient temperatures, the pressure vessel comprising:

an inner pressure container enclosing a storage volume;

an outer container surrounding the inner pressure container and forming an evacuated space therebetween;

a thermal insulator surrounding the inner pressure container in the evacuated space to inhibit heat transfer to the storage volume; and a container liner lining an inner surface of the inner pressure container and having a fluid-impermeable layer located thereon to substantially inhibit vacuum loss in the evacuated space due to fluid permeation through the inner pressure container from the storage volume, whereby cryogenic insulation may be maintained when storing cryogenic liquids or compressed gases at cryogenic temperatures.

2. The lightweight, cryogenic-compatible pressure vessel as in claim 1, wherein the inner pressure container has a fiber-reinforced composite construction.

3. The lightweight, cryogenic-compatible pressure vessel as in claim 1, wherein the container liner is comprised of a lightweight non-metallic material.

4. The lightweight, cryogenic-compatible pressure vessel as in claim 3, wherein the container liner is comprised of a polymeric material.

5. The lightweight, cryogenic-compatible pressure vessel as in claim 1,
wherein the fluid-impermeable layer is substantially impermeable to $H_2$.

6. The lightweight, cryogenic-compatible pressure vessel as in claim 1,
wherein the fluid-impermeable layer is configured to flex due to expansion/contraction of the container liner.

7. The lightweight, cryogenic-compatible pressure vessel as in claim 1,
wherein the fluid-impermeable layer comprises a fluid-impermeable glassy layer located on the container liner.

8. The lightweight, cryogenic-compatible pressure vessel as in claim 7,
wherein the fluid-impermeable glassy layer is substantially impermeable to $H_2$.

9. The lightweight, cryogenic-compatible pressure vessel as in claim 1,
further comprising means for capturing permeated fluid in the evacuated space.

10. The lightweight, cryogenic-compatible pressure vessel as in claim 9,
wherein the means for capturing permeated fluid in the evacuated space is a getter material located in the evacuated space.

11. The lightweight, cryogenic-compatible pressure vessel as in claim 9,
wherein the means for capturing permeated fluid in the evacuated space utilizes a catalyst to react the permeated fluid with a reagent.

12. The lightweight, cryogenic-compatible pressure vessel as in claim 11,
wherein the catalyst is used to react permeated hydrogen with oxygen to form ice.

13. The lightweight, cryogenic-compatible pressure vessel as in claim 9,
wherein the means for capturing permeated fluid in the evacuated space includes a dendritic surface for increasing the surface area to enhance sequestration rates.

14. The lightweight, cryogenic-compatible pressure vessel as in claim 1,
further comprising means for purging permeated fluid from the evacuated space.

15. The lightweight, cryogenic-compatible pressure vessel as in claim 14,
wherein the means for purging permeated fluid comprises a mechanical vacuum pump.

16. The lightweight, cryogenic-compatible pressure vessel as in claim 14,
wherein the means for purging permeated fluid comprises an electro-chemical (ion) pump.

17. The lightweight, cryogenic-compatible pressure vessel as in claim 14,
wherein the means for purging permeated fluid comprises a specific-fluid-only permeable membrane located on the outer container enabling permeation of the specific fluid therethrough due to a concentration gradient thereof.

18. The lightweight, cryogenic-compatible pressure vessel as in claim 17,
wherein the specific-fluid-only permeable membrane is a palladium-containing membrane enabling permeation of $H_2$ therethrough.

19. The lightweight, cryogenic-compatible pressure vessel as in claim 14,
wherein the means for purging permeated fluid is configured to operate automatically to maintain a predetermined vacuum pressure in the evacuated space.

20. The lightweight, cryogenic-compatible pressure vessel as in claim 1,
further comprising at least one of means for capturing permeated fluid in the evacuated space, and means for purging permeated fluid from the evacuated space.

21. The lightweight, cryogenic-compatible pressure vessel as in claim 1,
wherein the thermal insulator comprises a plurality of reflective layers.

22. The lightweight, cryogenic-compatible pressure vessel as in claim 21,
wherein the thermal insulator is MLVSI (multi-layer vacuum superinsulation).

23. A lightweight, cryogenic-compatible pressure vessel for flexibly storing cryogenic liquid fuels or compressed gas fuels at cryogenic or ambient temperatures in vehicles, the pressure vessel comprising:
an inner pressure container enclosing a fuel storage volume;
an outer container surrounding the inner pressure container and forming an evacuated space therebetween;
a thermal insulator surrounding the inner pressure container in the evacuated space to inhibit heat transfer to the fuel storate volume; and
means for substantially inhibiting vacuum loss in the evacuated space due to fuel permeation through the inner pressure container, wherein the means for substantially inhibiting vacuum loss includes a fluid-impermeable layer located on a container liner lining an inner surface of the inner pressure container, whereby cryogenic insulation may be maintained when storing cryogenic liquid fuels or compressed gas fuels at cryogenic temperatures.

* * * * *